United States Patent [19]

Lawrence

[11] Patent Number: 5,021,794

[45] Date of Patent: Jun. 4, 1991

[54] PERSONAL EMERGENCY LOCATOR SYSTEM

[76] Inventor: Robert A. Lawrence, 1320 S. Santa Fe Ave., Los Angeles, Calif. 90021

[21] Appl. No.: 394,011

[22] Filed: Aug. 15, 1989

[51] Int. Cl.$^5$ .............................................. G01S 3/02
[52] U.S. Cl. .................................................. 342/457
[58] Field of Search ........................... 342/457, 56, 44

[56] References Cited

U.S. PATENT DOCUMENTS

| | | | |
|---|---|---|---|
| 3,440,635 | 4/1969 | Hull | 340/277 |
| 3,644,883 | 2/1972 | Borman et al. | |
| 3,750,131 | 7/1973 | Fletcher et al. | 340/277 |
| 4,157,540 | 6/1979 | Oros | 340/539 |
| 4,259,664 | 3/1981 | Boisclair | 340/539 |
| 4,300,129 | 11/1981 | Chataldo | 340/539 |
| 4,535,324 | 8/1985 | Levental | 340/574 |
| 4,591,836 | 5/1986 | Feigenblatt, Jr. | 340/574 |
| 4,606,073 | 8/1986 | Moore | 455/89 |
| 4,694,284 | 9/1987 | Leveille et al. | 340/574 |
| 4,799,062 | 1/1989 | Sanderford, Jr. et al. | 342/457 |
| 4,818,998 | 4/1989 | Apsell et al. | 342/457 |

*Primary Examiner*—Theodore M. Blum
*Attorney, Agent, or Firm*—Robert Louis Finkel

[57] ABSTRACT

The radio transmitter in a miniaturized transceiver concealed on a person to be located, such as a lost child, is activated and transmits a coded UHF radio homing signal upon receipt of an initiating signal containing the child's address code. The initiating signal is automatically transmitted by a repeater station in response to an audible "panic signal" containing the address code and contains the identical address code. The panic signal is a pulse tone produced by a hand held tone generator activated by the child's parent and is transmitted to the repeater station by telephone. Tracking vehicles are provided with automatic UHF radio direction finding and distance measuring equipment for locating the source of the homing signal. Stored information concerning the child can be transmitted to the tracking vehicles.

5 Claims, 4 Drawing Sheets

PERSONAL EMERGENCY LOCATOR SYSTEM

BACKGROUND OF THE INVENTION

1. Field of the Invention

This invention relates to emergency locator systems utilizing radio beacons for locating lost, incapacitated, or abducted persons. More particularly it relates to a system wherein a search for the missing individual can be initiated by remote activation of a beacon carried by the person.

2. Prior Art

The use of radio beacons and direction finding equipment for locating individuals is well known. One class of such beacons takes the form of a VHF or UHF transmitter adapted to be carried or worn by the person to be located. Means are provided to enable the user to activate the transmitter in an emergency. By way of example, the wrist watch alarm of U.S. Pat. No. 4,591,836 produces a radio signal when it is released from the wrist. The "caller" of U.S. Pat. No. 4,694,284 transmits when its flap-switch is manually operated.

All of these devices require the missing or endangered person to recognize the emergency and perform some act to initiate the beacon's transmission. For the kidnapped infant, exploring toddler, or wandering senior with little or no appreciation of danger and limited manual dexterity, such devices are of little, if any, value. Likewise, even to a robust adult their utility may be severely reduced in the presence of an armed assailant.

A second class of locator device has been adapted for situations in which its use must not be divulged, as for example, to an assailant or abductor. In this category, U.S. Pat. No. 4,535,324 utilizes a beacon activated by squeezing the sides of a finger ring, and U.S. Pat. No. 4,300,129 shows a radio alarm having a secret triggering mechanism contained in a belt buckle. U.S. Pat. No. 3,440,635 employs switch means which can be hidden virtually anywhere on the wearer.

Another category of systems has been developed in which a warning or tracking signal is transmitted upon the passage of a predetermined amount of time, or upon receipt of an actuating signal generated by a triggering device carried and surreptitiously tripped by the person to be aided or located. U.S. Pat. No. 4,259,664 shows such a system for alerting the authorities to a taxicab robbery. U.S. Pat. No. 3,750,131 illustrates a system for schools which is actuated by an inaudible signal generated by the teacher's hand-held transmitter. U.S. Pat. No. 4,606,073 depicts a hybrid system which transmits a prerecorded message over the radio in a police car. None of these systems is applicable for locating a very young, or physically handicapped, or mentally impared person who might be lost or confronted with an emergency. Additionally, none of them provides means for locating the endangered person who has left or been removed from the vehicle containing the beacon.

The present invention is intended to overcome these, and other deficiencies which are inherent in the aforementioned prior art devices and systems.

An object of the invention is the provision of an emergency locator system for locating lost, incapacitated, or abducted persons who because of their age, physical, mental or emotional condition, or other disability are unable to activate the beacon transitter of any of the existing devices or systems.

Another object is the provision of an emergency locator system which can be activated by a concerned individual without the need for any action by the person to be located.

Still another object is the provision of a system for locating an abduction victim which can be initiated remotely without detection by the abductor.

Yet another object is the provision of an emergency locator system which is capable of initiating and supporting concurrent searches for a plurality of missing persons.

A further object is the provision of a personal emergency locator system which is capable of identifying and locating a missing person selectively from among a plurality of participants in the system.

Other objects and features of the invention and its operation will become apparent to the reader from the following summary of the invention and detailed description of several of its preferred embodiments as illustrated in the accompanying drawings.

SUMMARY OF THE INVENTION

The present invention provides a miniaturized ultra high-frequency radio transceiver concealed in a collar, wrist watch or other article to be worn or carried by the person to be located, for an example, a missing child. A signal generator carried by an interested second person, for example, the child's parent, is activated to transmit a discrete audible digital pulse address code over a conventional key tone telephone to a repeater station. At the repeater station, this "panic signal" is processed and then transmitted as a non-directional UHF radio "initating signal" containing the unique address code and a clock synchronizing pulse.

Receipt of the initiating signal by the transceiver on the child triggers an internal switch, causing the transmitter section of the transceiver to transmit a non-directional UHF "homing signal."

To locate the source of the homing signal, police cars or airborne units in the locality, or privately operated vehicles are equipped with UHF radio direction finding and distance measuring equipment. With such equipment indicating the transceive's direction and distance, the person to be located can be pin-pointed and approached, or placed under surveillance and followed without detection, as the circumstances warrant.

This system can be implemented to allow information concerning the person to be located, for example, his or her sex, height, weight, eye coloration, and the like, to be transmitted to the tracking units. Since each signal generator and its associated transceiver are assigned a unique address code, the direction finding and distance measuring equipment in the mobile search units can readily distinguish the homing signal emitted by one source from similar but differently coded signals emitted by numerous other sources. By the same token, with appropriate switching means a single search vehicle can easily keep track of (if not actually follow) homing signals from a number of sources virtually simultaneously.

THE DRAWINGS

Although the invention lends itself to a variety of applications, for a clear understanding of its construction and operation, a preferred embodiment and several alternative features are depicted in the drawings.

DETAILED DESCRIPTION OF THE PREFERRED EMBODIMENTS

Figure 1:
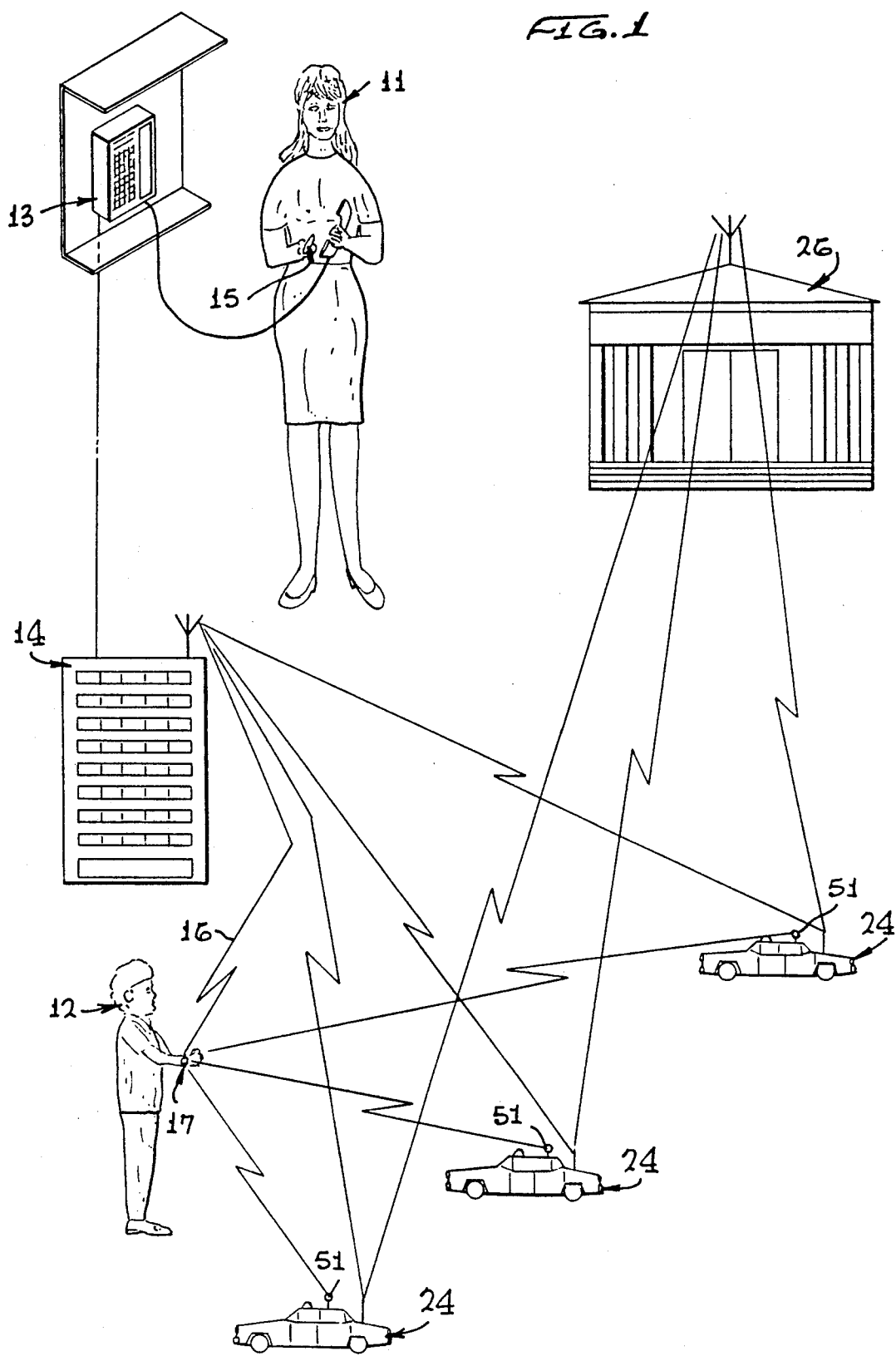
FIG. 1 is a fanciful block diagram showing the basic components of a personal emergency locator system embodying the subject invention.

Referring to FIG. 1, a parent 11, realizing that her young child 12 has wandered off and not being able to locate the child after contacting nearby neighbors, calls a designated emergency number on a touch tone telephone 13. When connected to the automatic receiving equipment at a conveniently located repeater station 14 maintained by the system operator, she holds her signal generator 15 to the telephone mouthpiece and depresses a button on the generator to produce an audible pulse tone, the aforementioned "panic signal." This tone contains a unique digitized coded address assigned exclusively to the child 12 by the system operator, and a clock synchronizing pulse.

At the repeater station 14, the coded address contained in the panic signal is imposed on a UHF radio carrier and retransmitted as the previously mentioned initiating signal 16.

In addition to signal generator 15, as a participant in the system, parent 11 has been provided a transceiver 17 for her child 12. Preferably, the transceiver 17 is hidden in a bracelet or necklace secured to the child's wrist or neck, or in some other article of adornment or clothing which can be worn or carried on the child at all times without fear of loss or detection.

Transceiver 17 is comprised of two sections, receiver 21, and transmitter 22. Receiver 21 contains switching means responsive solely to the coded address produced by generator 15. Upon receipt of a UHF initiating signal of the proper frequency and bearing the pre-assigned address code, the switching circuitry of transceiver 17 activates transmitter 22 Transmitter 22 transmits a UHF homing signal 23 modulated to carry the coded address associated with child 12.

Mobile field stations, such as police cars 24, are provided with UHF direction finding and distance measuring equipment for receiving homing signal 23. This equipment indicates the direction and distance to the transceiver 17, and thus the location of child 12, with great precision.

Typically, police cars 24 are in two-way radio communication with a central dispatcher 26. In many regions the police cars 24 are equipped with computer terminals and have data acquisition and transmission capability as well. While forming no part of the subject invention, two-way voice communication and data transfer means may be employed to augment the invention and facilitate a search.

Figure 2:
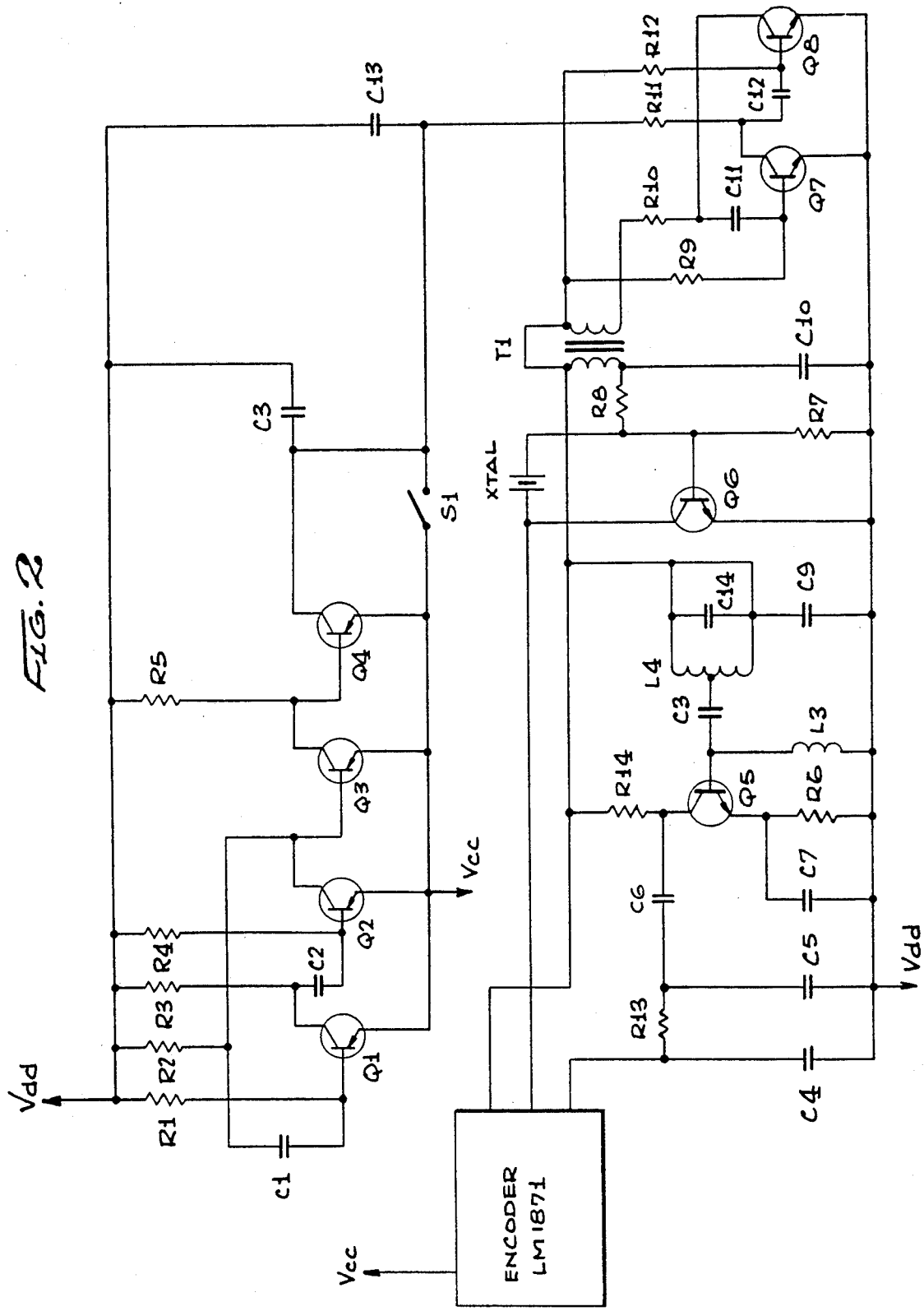
FIG. 2 is a circuit diagram of the electronic signal generator shown in FIG. 1.
Figure 3:
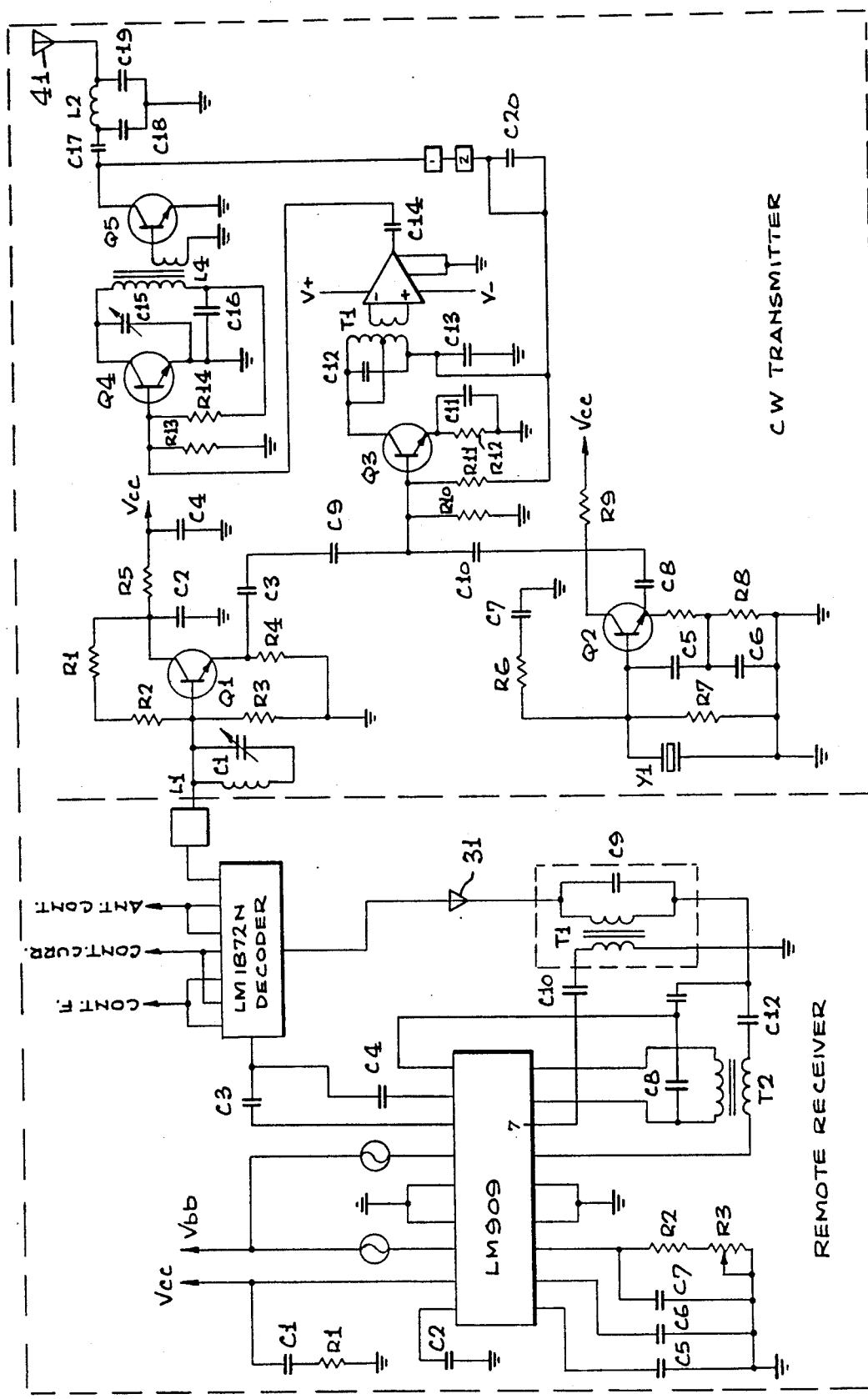
FIG. 3 is a circuit diagram of the transceiver shown in FIG. 1.
Figure 4:
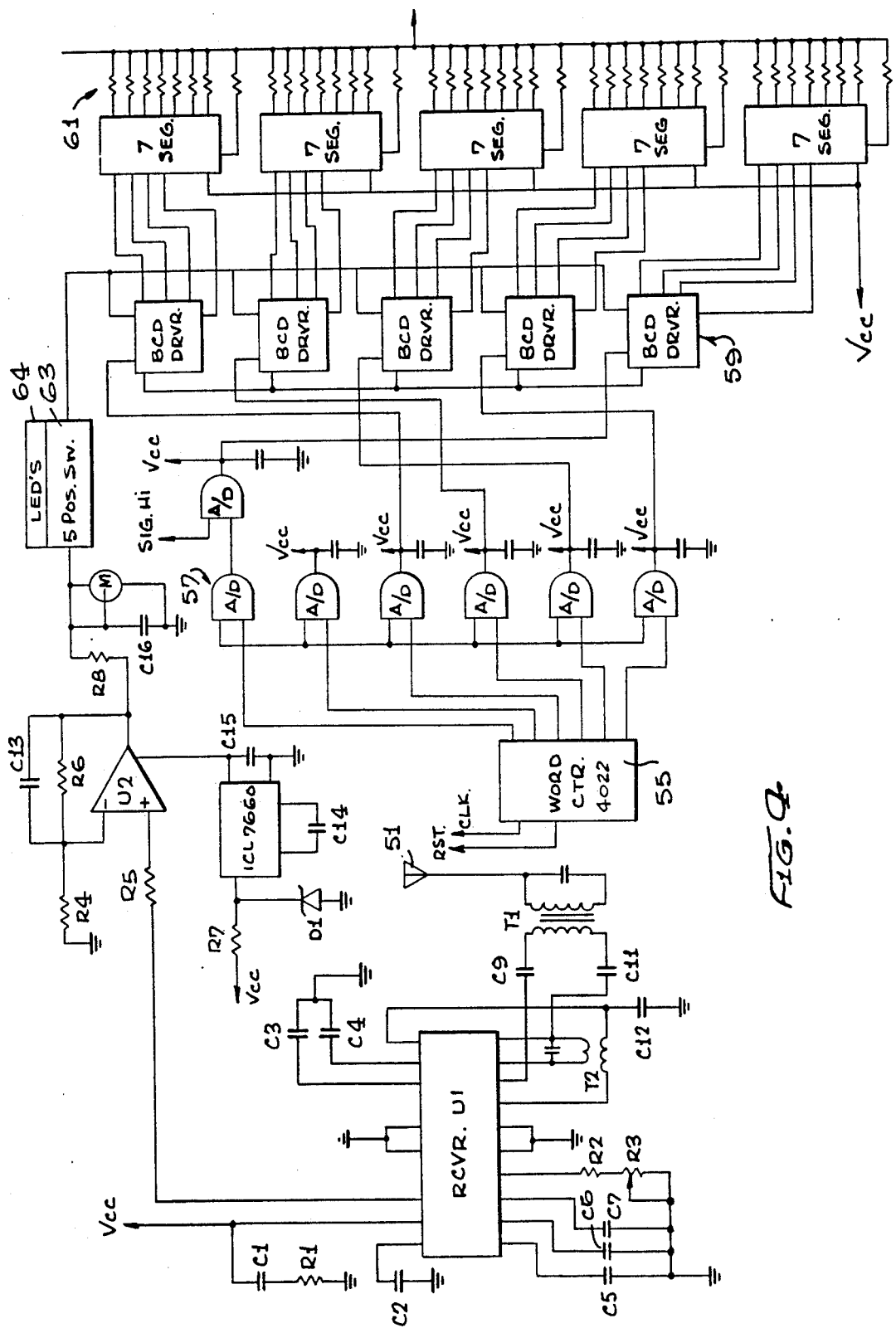
FIG. 4 is a circuit diagram of the receiver, direction finder and distance measuring equipment in the mobile field stations shown in FIG. 1.

For a more detailed understanding of the makeup and operation of the several components of the locator system, reference is made to FIGS. 2-4.

In the embodiment of signal generator 15 shown in FIG. 2, depressing the previously mentioned button closes switch Sl, sending positive circuit voltage Vcc to the four cascaded transistors Q1, Q2, Q3, Q4 and setting the limit of the controlling circuit current.

This current activates the high-stability crystal oscillator XTAL, who's signal is processed by amplifier T1 and its supporting network, resisistors R13 and R14, transistors Q5 and Q6, and capacitors C5 and C14. Amplifier T1 transmits the controlled signal through its network to the encoder LM 1871, where it is converted to an audible 7 bit digital pulse address code with a clock synchronizing pulse. This pulsed signal is carried over the phone line to the repeater station 14, where it is retransmitted by conventional radio means (not shown) as the initiating signal, at an ultra high frequency.

FIG. 3 illustrates the receiving and transmitting components of the transceiver 17 carried by child 12.

The receiver of FIG. 3 receives the initiating signal 16 by the antenna 31 at amplifier T1. The signal is decoded by the LM 1872N decoder. The decoded signal is sent through amplifier T1 and capacitor C10, to Pin 7 of IC U1 phase lock loop chip LM 909, where the signal is digitized and sent to switch LN 509. Switch LN 509 electronically connects the receiver section to the transmitter section, and introduces the digitized signal into the transmitter section of the transceiver as a coded address signal at inductor L1, capacitor C1, and transistor Q1.

Inductor L1, capacitor C1, and transistor Q1 define a variable oscillator. When energized by the decoded signal, this oscillator sets the frequency of crystal amplifier Y1 and transistor Q2. The crystal amplifier output is fed to the mixer circuit comprising transistor Q3, resistor R12, and capacitor C11, and then tuned to the output frequency of amplifier T1 and capacitor C12. The signal is then processed through U1 comparator LM0036, C14 Q4, and variable capacitor C15 to filter out the undesirable transcients. The filtered signal is fed through amplifier T3, inductor L4, transistor Q5 and inductor L2, and transmitted out through the transmitter antenna 41 as ultra high frequency homing signal 23 with a range preferably, of about five miles.

As shown in FIG. 4, this homing signal is received by directional antenna 51, amplifier T1, and capacitor C10, of the field station in each of the police cars 24 of FIG. 1. Signal 23, is processed through phase lock loop, radio frequency field effect amplifier, and automatic gain control circuitry in receiver U1. From there it is sent to the plus side of the meter amplifier U2 for signal strength detector M1.

The phase lock loop circuit of receiver U1 controls the polarity of the signal. A voltage regulator U3 is provided for stablizing the voltage of the meter amplifier U2. As with conventional automatic radio direction finding equipment, the pointer of detector M1 is electronically synchronized with the rotation of directional antenna 51. The pointer indicates the bearing to the source of homing signal 23, transmitter 22, when antenna 51 is in the null position, that is, when its plane is perpendicular to the direction of wave travel from transmitter 22.

At the same time meter M1 is indicating the bearing to the source of homing signal 23 its clock pulse triggers word counter 55 which forms the seven bit binary address code transmitted by transmitter 22. The six outputs of the word counter are sent to the six A-to-D converters 57, and then input to the five BCD drivers 59 along with the meter signal from M1 Depending upon the strength of the signal, the BCD drivers will drive the current to turn on the appropriate segments of the five seven segment digital displays 61 to indicate the distance in feet to the signal source on the child 12.

If desired, information regarding missing child 12 can be transmitted by the system operator to a police central dispatcher for retransmission to the police vehicles involved in locating the person to be located. Alternatively, such information may be transmitted by the system operator directly to the vehicles involved in the search. This information, updated from time to time, may be maintained in data storage with the system operator, or it may be retained in the parent's tone generator 15 and transmitted with the panic signal for retransmission with the initiating signal.

The information may be transmitted as the initiating signal is transmitted, so that it is available immediately to the searchers, or it may be retained until it is specifically requested by the police or private searcher, utilizing the address code in the homing signal 23, after he has started receiving the homing signal 23.

The information may be communicated by various means, but preferably it is transmitted by conventional data link and either printed, or display on a CRT, in the police cars 24.

A five position switch 63 with associated LEDs 64 for each of its positions may be used for monitoring signals from other transceivers in the system. To receive a homing signal from another source, the switch 63 is cycled to the LED that lights next. The pointer on the meter M1 will move to the direction of the new signal and the distance to the source of the signal will be shown in feet on the seven-segment displays. By transmitting the address code for each new homing signal to the police station computer with a return request, a preprogrammed personal profile of information concerning the missing person associated with that code can be obtained as well.

While I have described the invention in terms of several preferred embodiments, it is not to be construed as limited to those embodiments and they are to be regarded as illustrative rather than restrictive. It is my intention by this specification to cover any and all variations of the examples I have chosen for purposes of the disclosure, which do not depart from the spirit and scope of the following claims.

I claim:

1. A telephone-activated personal emergency locator system, comprising:

portable signal generating means adapted to be actuated by an individual interested in locating a lost or abducted person, said signal generating means generating an audible digital pulse-tone signal containing a discrete encoded address for transmission by means of a telephone system;

repeated means effectively connected to said telephone system for receiving audible digital pulus-tone signals transmitted by said telephone system, said repeater means including radio transmitter means for generating and transmitting a radio-frequency initiating signal containing said encoded address upon receipt of a digital pulsetone signal from said signal generating means.

radio transceiver means carried by a person to be located for receiving an initiating signal transmitted by said repeater and transmitting a radio homing signal containing said encoded address in response to said initiating signal; and radio receiver means for receiving and identifying said homing signal and determining there from the bearing and distance from said receiver to said transceiver.

2. The personal emergency locator system of claim 1, wherein said homing signal is in the radio ultrahigh frequency range.

3. The personal emergency locator system of claim 2, wherein said radio receiver includes an automatic direction finder and distance measuring equipment.

4. The personal emergency locator system of claim 3, wherein said radio receiver is mobile.

5. The personal emergency locator system of claim 4, comprising a plurality of such radio receivers.

* * * * *